United States Patent [19]

Foss

[11] 4,353,798
[45] Oct. 12, 1982

[54] APPARATUS FOR REMOVING POLYCHLORINATED BIPHENYLS FROM CONTAMINATED TRANSFORMER DIELECTRIC LIQUID

[75] Inventor: Stephen D. Foss, Pittsfield, Mass.

[73] Assignee: General Electric Company

[21] Appl. No.: 268,976

[22] Filed: Jun. 1, 1981

Related U.S. Application Data

[62] Division of Ser. No. 151,152, May 19, 1980, Pat. No. 4,299,704.

[51] Int. Cl.³ .............................................. B01D 21/00
[52] U.S. Cl. ................................................... 210/181
[58] Field of Search ............... 210/186, 634, 737, 774, 210/909, 179, 181, 182, 187, 259, 294, 512.1–512.3, 533

[56] References Cited

U.S. PATENT DOCUMENTS

| 1,291,857 | 1/1919 | Hankar | 210/512.3 |
| 2,073,520 | 3/1937 | Saint-Jacques | 210/512.3 |
| 2,191,490 | 2/1940 | Mitterer | 210/186 |
| 3,731,802 | 5/1973 | James | 210/533 |

*Primary Examiner*—Ivars C. Cintins
*Attorney, Agent, or Firm*—Robert A. Cahill

[57] ABSTRACT

Immiscibility between polychlorinated biphenyl (PCB) substances and retrofilled non PCB transformer dielectrics allows for the mechanical separation of the PCB substances from the retrofilled dielectrics. Sedimentation, filtration and centrifugation can be employed in the separation process.

2 Claims, 3 Drawing Figures

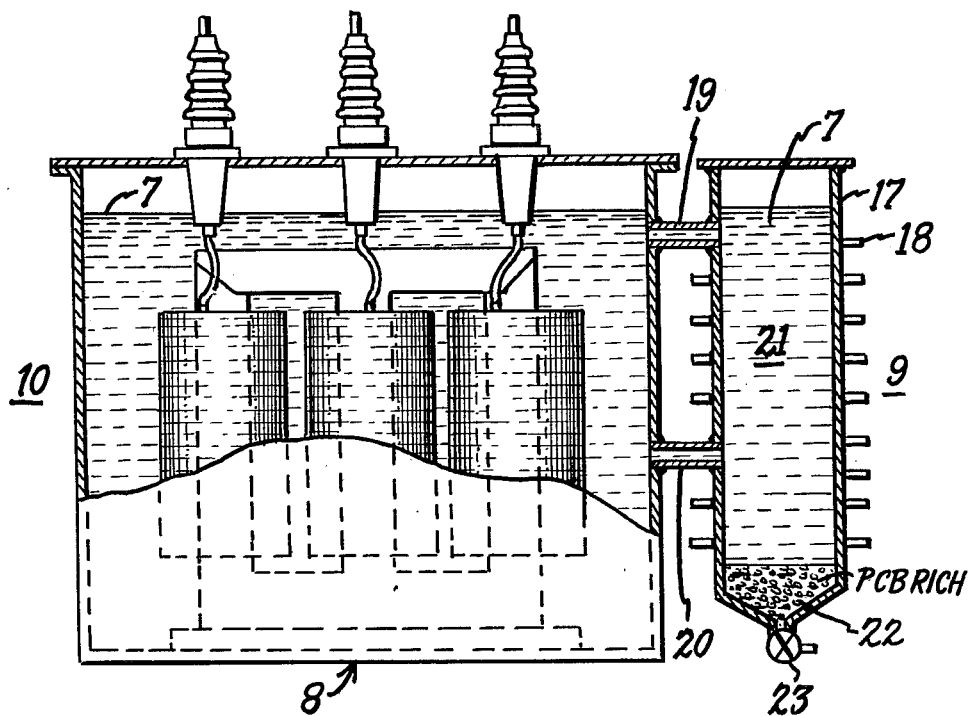

APPARATUS FOR REMOVING POLYCHLORINATED BIPHENYLS FROM CONTAMINATED TRANSFORMER DIELECTRIC LIQUID

This is a division of application Ser. No. 151,152, filed May 19, 1980, now U.S. Pat. No. 4,299,704.

BACKGROUND OF THE INVENTION

Transformers containing nonflammable dielectric fluids which contain polychlorinated biphenyls (PCBs) should be drained and refilled with high flashpoint dielectrics that do not contain PCBs. Methods currently proposed for removing the PCB dielectric and replacing the PCB dielectric with non PCB dielectrics do not appear to be capable of preventing PCB contamination of the non PCB replacement dielectric. One such method suggests removing the PCB dielectric material and refilling the transformer with biodegradable high flashpoint dielectric liquid. A connection is made between the transformer and a container full of a filter material and the transformer liquid is continually transported through the filter material during transformer operation. Once the transformer dielectric reaches a low level of PCB contamination, the filter is removed and the transformer is allowed to operate as a non PCB transformer. The material comprising the filter is proprietary to the manufacturer, and is not generally known. It is believed, however, to be specific to the biodegradable dielectric fluid used as the PCB replacement dielectric and it is not known whether the same filter material would work with a high flashpoint silicone dielectric fluid.

The purpose of this invention is to describe a system used for removing residual PCBs from transformers that have been drained and retrofilled with silicone dielectric fluid.

SUMMARY OF THE INVENTION

The invention comprises a system for removing PCB contaminants from silicone dielectric fluid by allowing the silicone to dissolve the PCB material at a first temperature and to remove the PCB material at low temperature by means of a two phase separation process. The undissolved PCB material is mechanically removed by centrifuge filter or gravitational separation.

BRIEF DESCRIPTION OF THE DRAWINGS

FIG. 3 is a side sectional view of one embodiment for removing PCBs from the retrofilled transformer dielectric during the life of the transformer.

DESCRIPTION OF THE PREFERRED EMBODIMENT

This invention relates in general to the discovery of a two phase solubility equilibrium between polychlorinated biphenyls (PCB) and trichlorobenzene (TCB) with silicone dielectric fluid.

Figure 1:
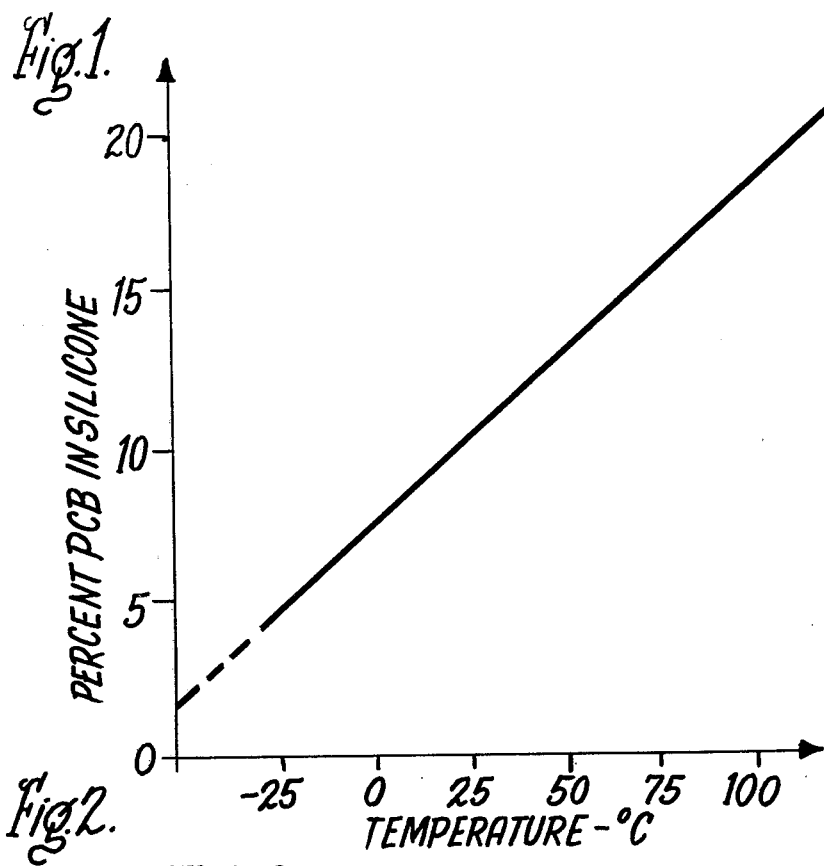
FIG. 1 is a graphic representation of the solubility of PCB in silicone dielectric fluid as a function of temperature.

The invention realizes the large disparancy that exists between the specific gravity of the PCB and TCB relative to the dielectric silicone fluid and removes the PCB and TCB material by mechanical separation means. The percent PCB and TCB solubility in silicone dielectric fluid as a function of temperature is shown in FIG. 1. Since the PCB and TCB material have similar properties relative to the silicone dielectric fluid only PCB will be discussed hereafter. At temperatures in the order of 100° C., 20% PCB is soluble in the silicone dielectric fluid. When the temperature is reduced to 25° C., only 10% PCB is soluble within the silicone dielectric fluid. The difference in solubility results in a two phase system wherein mixtures in excess of 100° C. are "PCB rich" and mixtures less than 25° C. are "silicone rich". Approximately 10% of the original PCB material remains in transformers which were retrofilled with silicone dielectric fluid and slowly leaches out with time. It has been determined that the PCB material adsorbed within the windings and winding insulation material more rapidly leaches out into solution with the silicone dielectric fluid when the transformer is operated between 70° and 90° C. When the transformer has been operating for several weeks at these temperatures, some of the remaining PCB material within the windings and winding insulation material leaches out into the silicone dielectric fluid until the silicone dielectric fluid at 70°–90° C. becomes saturated with the PCB material at 15%. It has been discovered that when the PCB rich silicone dielectric fluid at the transformer operating temperature is cooled down to approximately 25° C., some of the PCB material comes out of solution since the PCB saturation is reduced to 10% at 25° C. It was further discovered that the undissolved PCB material drops to the bottom of the silicone dielectric fluid due to the heavy specific gravity of roughly 1.5 grams per cc for the PCB material relative to roughly 1.0 grams per cc for the silicone dielectric fluid. Although gravimetric separation due to the differences in the specific gravities involved is an effective method for separating the excess PCB material, other mechanical means of separation such as centrifuging and filtering can also be employed. If the temperature of the PCB-silicone dielectric fluid mixture is dropped to a still lower temperature, such as −25° C., the PCB saturation is reduced to 5% and further excess PCB material comes out of the mixture.

Figure 2:
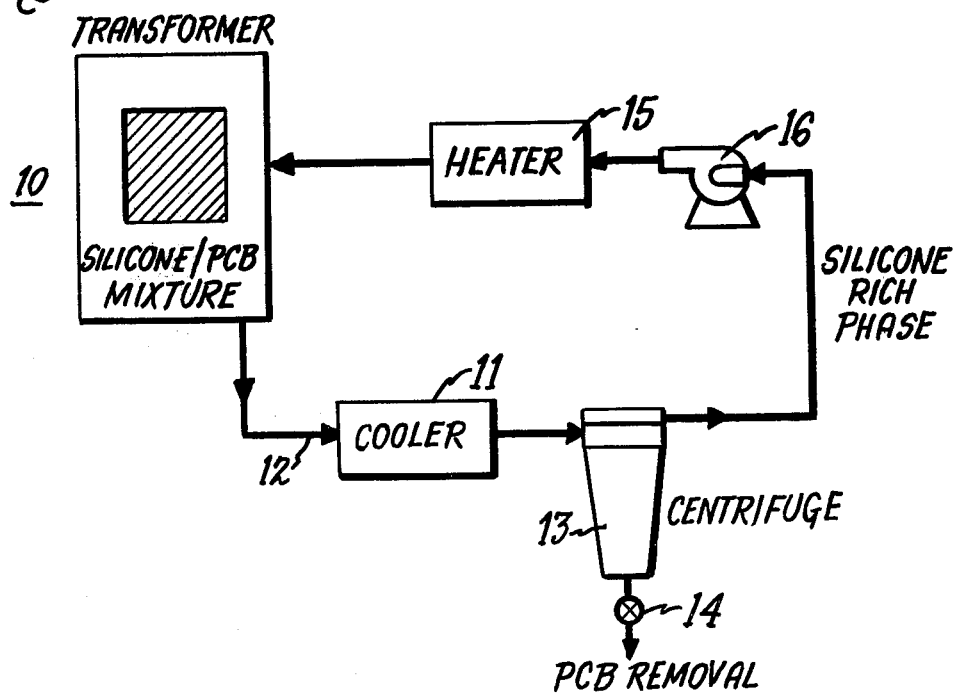
FIG. 2 is a diagrammatical representation of the apparatus and processes employed within the instant invention.

A practical method for removing PCB material from silicone dielectric fluid can be seen by referring to FIG. 2 wherein a transformer 10 containing a PCB contaminated silicone dielectric fluid is connected to cooler 11 by means of piping system 12. The PCB silicone dielectric fluid mixture is then reduced in temperature to approximately 25° C. to form a PCB rich phase which is transferred to centrifuge 13 for extracting the PCB material which is subsequently removed by means of valve 14. The PCB rich phase measures approximately 99% PCB content so that after separation, the remaining silicone rich phase measures approximately 90% silicone dielectric fluid. The silicone rich phase is then transported to heater 15 by means of pump 16 and it is reheated to between 70° and 90° C. and piped back into transformer 10. Heater 15 is used in order not to disturb the thermodynamics of the transformer in operation but can be dispensed with if so desired. In place of centrifuge 13 a settling tank with or without filters can be employed. The system of FIG. 2 can be permanently attached to a transformer or can be utilized as a PCB extraction service wherein a mobile system can be employed in the following manner. A refrigerated truck can be driven to the transformer site and connected to the transformer for removing PCB contaminated silicone dielectric fluid at the operating temperature of the transformer. Extraction means such as a centrifuge, settling tank or filter can be employed within the refrigerated truck to remove the PCB rich phase and the silicone rich phase can be returned to the transformer. The PCB rich phase can be disposed in the manner suggested by the Environmental Protection Agency.

FIG. 3 shows a system 9 for continuous removal of PCB material from silicon dielectric fluid which operates in the following manner. Transformer 10, shown simply as consisting of a tank 8 containing a retrofilled silicone dielectric fluid 7 containing PCB material from the coil and coil insulating material (not shown) is connected to a separation tank 17 which contains a plurality of cooling fins 18, an inlet 19 near the top of tank 17 and an outlet 20 near the bottom. Inlet 19 and outlet 20 can have valves for regulating the transport of the silicone dielectric fluid from transformer tank 8 into separator tank 17 if so desired. During operation, the silicone PCB contaminated silicone dielectric fluid mixture within transformer tank 8 reaches a steady state temperature between 70° and 90° C. during transformer operation whereas the PCB contaminated silicone dielectric fluid in separator tank 17 reaches a substantially lower temperature and rapidly separates into a silicone rich phase 21 and a PCB rich phase 22. Over a period of time the PCB rich phase settles by gravition to the bottom of tank 17 where it can be removed by means of extraction valve 23. There will be a slow continuous flow of a silicone rich phase 21 back into transformer tank 8 by means of outlet 20 since the pressure exerted by the colder silicone rich phase 21 should be slightly greater than the pressure exerted by the hotter contaminated silicone dielectric fluid 7 within transformer tank 8. Since the quantity of PCB material adsorbed within the transformer coil and coil insulating materials in a retrofilled transformer tank containing silicone dielectric fluid represents about 10% by weight of the original PCB material, calculations show that the leach rate of PCB material out into the silicone dielectric fluid is a function of the rate of extraction of the PCB phase from within separator tank 17. The rate of extraction can be increased by supplementally cooling separator tank 17 by means of fans or liquid refrigerants. During steady state transformer operation, the temperature of the PCB contaminated silicone dielectric fluid 7 within transformer tank 8 will be higher than the temperature of the PCB rich phase within separator tank 17. This will cause the cooler silicone rich phase 21 within separator tank 17 to flow back to transformer tank 8 through outlet 20 which results in a constant replenishment of PCB contaminated silicone dielectric fluid 7 from transformer tank 8 to separator tank 17 by means of inlet 19. The dimension of inlet 19 and outlet 20 can be adjusted in size or valved accordingly to control the flow and return rates.

What I claim as new and desired to secure by Letters Patent of the United States is:

1. A system for removing polychlorinated biphenyl (PCB) from a silicone dielectric fluid contained in a power transformer tank, said system comprising, in combination:
   a separator tank;
   conduit for conveying silicone dielectric fluid from the transformer tank for introduction into the upper portion of said separator tank;
   a valve for controlling the flow of silicone dielectric fluid from the transformer tank into said separator tank;
   means physically associated with one of said conduit and said separator tank for cooling the silicone dielectric fluid, whereby to reduce the solubility of PCB in silicone dielectric fluid and thus create in said separator tank a two-phase system consisting of a silicone rich mixture and a PCB rich mixture, said PCB rich mixture settling to the lower portion of said separator tank due to the higher specific gravity of PCB relative to silicone dielectric fluid;
   valved outlet in the bottom of said separator tank for controllably removing said PCB rich mixture;
   fluid handling means including conduit and a pump for conveying said silicone rich mixture from said separator tank back into the transformer tank; and
   a heater physically associated with said fluid handling means for heating said silicone rich mixture up to the approximate temperature of the silicone dielectric fluid contained in the transformer tank.

2. The system of claim 1 wherein said cooling means comprise a plurality of radiating fins attached to sidewalls of said separator tank.

* * * * *